Figure 2:
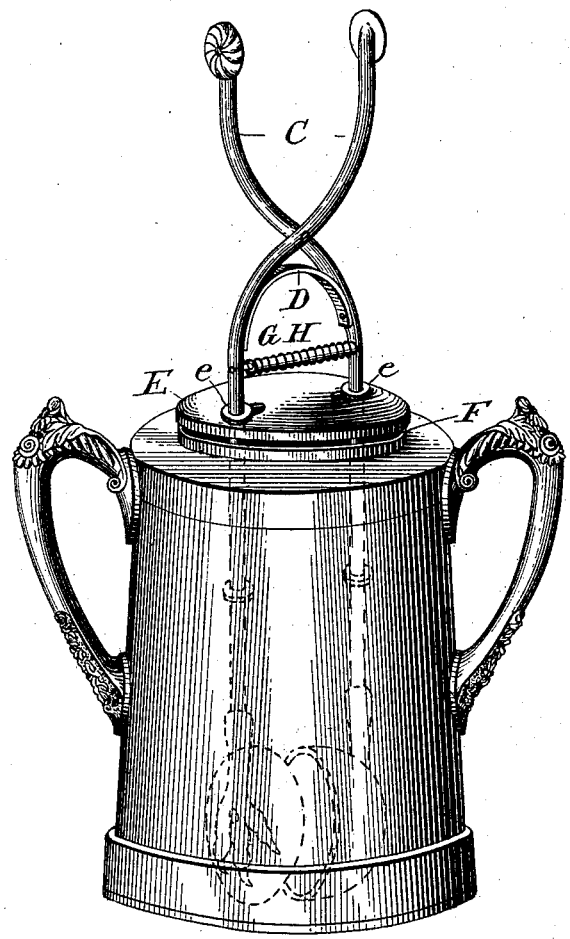

(No Model.) 2 Sheets—Sheet 1.

H. WETTSTEIN.
SCOOP LADLE.

No. 359,653. Patented Mar. 22, 1887.

Witnesses:
John Molitor
W. S. Wakeley

Inventor:
Herman Wettstein (No Model.) 2 Sheets—Sheet 2.

H. WETTSTEIN.
SCOOP LADLE.

No. 359,653. Patented Mar. 22, 1887.

Witnesses:
H. L. Frederick
Charlie Vierck

Inventor:
Herman Wettstein.

United States Patent Office.

HERMAN WETTSTEIN, OF HARVARD, ILLINOIS.

SCOOP-LADLE.

SPECIFICATION forming part of Letters Patent No. 359,653, dated March 22, 1887.

Application filed October 30, 1884. Serial No. 146,868. (No model.)

*To all whom it may concern:*

Be it known that I, HERMAN WETTSTEIN, a citizen of the United States, residing at Harvard, in the county of McHenry and State of Illinois, have invented certain new and useful Improvements in Scoop-Ladles; and I do hereby declare the following to be a full, clear, and exact description of the invention, such as will enable others skilled in the art to which it appertains to make and use the same, reference being had to the accompanying drawings, and to letters of reference marked thereon, similar letters indicating corresponding parts in the drawings.

The object of my invention is, first, to convey a certain quantity of liquid, granulated, or other small solid substances from one bowl or receptacle into another; second, to provide, in connection with said device, where desirable, a cover for the receptacle to which the scoop-ladle belongs, to exclude insects and dust therefrom; and, third, that the scoop-ladle or cream or sugar spoon may be in its proper place within the bowl and within convenient reach when the cream pitcher or bowl is covered up, thus preventing the misplacement of either the scoop or of the cover.

The mode of operation of this scoop-ladle is that as it is inserted into the contents to be conveyed they fill it, as the ladle is open. A pressure on the handle closes it, which pressure is retained while in transit, when as soon as the place of deposit is reached the pressure is relaxed, allowing the contents to drop out.

Figure 1:
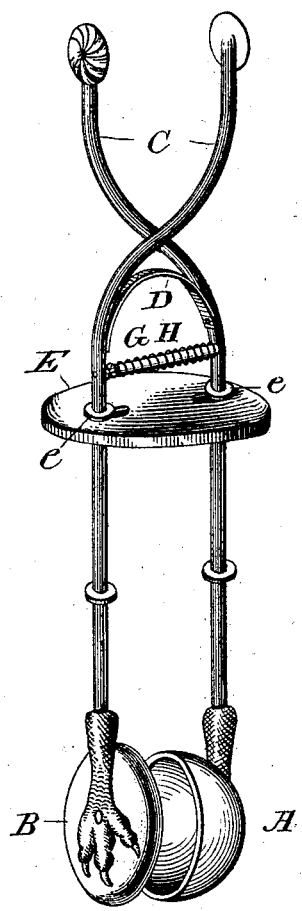
Figure 3:
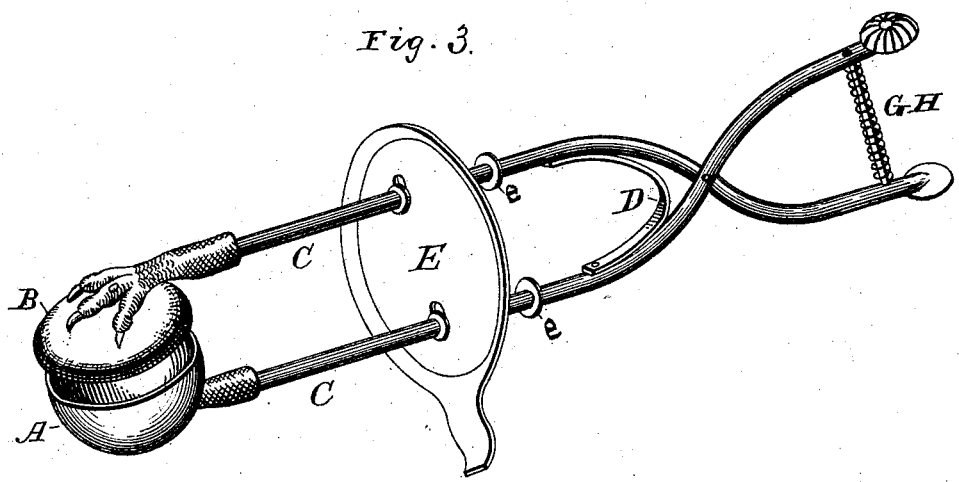

Figure 1 is a view of my scoop-ladle with cover attached, as they appear outside of a bowl or receptacle. Fig. 2 shows scoop-ladle in position in a bowl and the attached cover slightly raised from the opening in top of bowl. In both figures the scoop-ladle is open, this being its natural position, that the contents of the receptacle may fill it. Fig. 3 shows a slightly-modified form of my invention.

A is the scoop-ladle or spoon, which may be of any size or shape, according to the purpose for which it is to be used.

B is the cover of scoop A, which may be flat or hollow to increase the capacity of scoop A. Said cover B is by preference loosely attached to its handle, so that it may the more readily adjust itself to the edges of scoop A.

C C are the handles of scoop A and cover B. They are loosely riveted together where they cross each other, which allows them to turn as on a hinge-pin.

D is a spring, the object of which is to hold the handles C C, and with them scoop A and cover B, apart, that said scoop may be filled. The spring D may be attached to the handles C C at any desired point between them, and may consist of a strip running diagonally across from one handle to the other, if more desirable then the curved form shown in the drawings.

E is a cover designed for a cream-pitcher, sugar-bowl, or other receptacle requiring a light cover. It may therefore be of any size or shape, according to the kind of bowl it is intended to be used with. It is loosely attached to handles C C, by preference, so that it may slide up and down on said handles C C, whereby it rests on the top of a bowl, regardless of the depth to which the ladle enters it. The cover in the drawings is more especially designed for a cream-pitcher, the "nose" on said cover being intended for the "nozzle" usually found on such pitchers.

F is an opening in the middle of the top of a bowl or other receptacle to admit scoop A, cover B, and handles C, said opening having, by preference, a band or rim around it for cover E to rest on loosely. A corresponding rim is attached to or near outer edge of cover E, to loosely fit around said rim or within opening in top of bowl.

Handles C C pass through cover E by means of holes made larger or longer than the diameter of said handles, thus allowing them to play freely within said cover when scoop A is to be closed and opened.

*e e* are two plates or washers sliding up and down with cover E on handles C C, the object of said washers being to keep the two holes in cover E in which handles C work closed, that no insects or impurities may enter the bowl.

G H is a coil-spring and steady-pin combined, the object of the spring being to act as an assistant or as an equivalent to spring D in keeping the handles C C spread. The object of the steady-pin within said coil-spring is, first, to give firmness to said spring, and, second, that the handles C C may not be pressed together too close, for in such an event the handles below cover E would spread, which would open the scoop-ladle before the proper time. One end of said coil-spring and steady-pin G H is by preference firmly affixed to one of the handles C C, the other end of said steady-pin playing loosely within opposite handle, a shoulder on the steady-pin preventing handles C C from being pressed together beyond a certain limit. The coil-spring and steady-pin G H may also be attached to handles C C below their joint or hinge-pin, or below cover E, if deemed more practicable.

Rings or other projections may be firmly attached to one or both of handles C C below cover E, to prevent said cover from dropping down too far on said handles.

Reference is hereby made to my pending application, filed September 5, 1884, and in which the scoops are broadly claimed.

I am aware that single scoops or cups have been connected to the covers of mustard-pots, and this I disclaim.

I am also aware that egg-cups have been made in two parts and connected together by a spring handle or support which forces them together, and this I also disclaim. My invention differs from this in having two handles, which are pivoted together near their upper ends and held forced apart at their lower ends by means of a spring, both handles being passed down through a slotted cover, to which they are fastened.

Having thus described my invention, what I claim as new, and desire to secure by Letters Patent, is—

1. The combination of the two handles C, pivoted together near their upper ends, the scoop A, secured to one handle and the cover B to the other, with a spring for forcing the lower ends of the handles apart, substantially as shown.

2. Scoop-ladle A, firmly attached to one of the handles C, in combination with its adjustable scoop-cover B, loosely attached to its opposite handle C, substantially as and for the purposes set forth.

3. The combination of the scoop A, cover B, and the handles C, pivoted together, with the two springs D G and the guide-rod H, substantially as set forth.

4. The combination of the sliding cover E, hinged handles C, bowl or ladle A, and cover B, substantially as and for the purpose described.

5. The combination, in a spoon or scoop-ladle and bowl-cover, of scoop A, scoop-cover B, hinged handles C C, curved spring D, or its equivalent, and bowl-cover E, substantially as described, and for the purposes set forth.

6. Cover E, constituting the entire top of a receptacle, in combination with scoop A and scoop-cover B, attached to said cover E by handles C C, substantially as described.

7. The combination of the cover E with the plates or washers $e$, attached to handles C, hinged handles C, cover B, and ladle A, the cover E being provided with slots for the handles to pass through, substantially as specified.

8. The hinged handles C C, passing through cover E, with covered scoop-ladle attached to lower ends of said hinged handles C C, substantially as described, and for the purposes set forth.

9. The combination of cover B, ladle A, hinged handles C, spring D, coil-spring and steady-pin G H, attached to handle C, movable cover E, and the plates or washers $e$, substantially as and for the purpose described.

In testimony whereof I affix my signature in presence of two witnesses.

HERMAN WETTSTEIN.

Witnesses:
H. L. FREDERICK,
CHARLIE VIERCK.